US010424211B1

(12) United States Patent
Tzarnotzky et al.

(10) Patent No.: US 10,424,211 B1
(45) Date of Patent: Sep. 24, 2019

(54) AIRCRAFT COCKPIT DISPLAY AND INTERFACE

(71) Applicant: Kitty Hawk Corporation, Mountain View, CA (US)

(72) Inventors: Uri Tzarnotzky, Sunnyvale, CA (US); James Joseph Tighe, San Jose, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/940,703

(22) Filed: Mar. 29, 2018

Related U.S. Application Data

(60) Provisional application No. 62/641,889, filed on Mar. 12, 2018.

(51) Int. Cl.

| | |
|---|---|
| ***G08G 5/00*** | (2006.01) |
| ***G06F 3/041*** | (2006.01) |
| ***G01C 23/00*** | (2006.01) |
| ***G02B 27/01*** | (2006.01) |

(52) U.S. Cl.
CPC ......... *G08G 5/0052* (2013.01); *G01C 23/005* (2013.01); *G02B 27/01* (2013.01)

(58) Field of Classification Search
CPC .. G08G 5/0047; G08G 5/0052; G08G 5/0065; G08G 5/025; G08G 5/0008; G01C 23/005; G02B 27/01
See application file for complete search history.

(56) References Cited

U.S. PATENT DOCUMENTS

| | | | | |
|---|---|---|---|---|
| 7,719,483 | B2 | 5/2010 | Feyereisen | |
| 8,880,243 | B1 * | 11/2014 | Duvall | G08G 5/0021 701/120 |
| 9,950,807 | B2 * | 4/2018 | Kneuper | B64D 43/00 |
| 2005/0057440 | A1 * | 3/2005 | Naimer | G01C 23/005 345/8 |
| 2005/0182528 | A1 * | 8/2005 | Dwyer | G01C 23/00 701/3 |
| 2008/0195309 | A1 * | 8/2008 | Prinzel, III | G01C 23/00 701/532 |
| 2013/0321176 | A1 * | 12/2013 | Vasek | G08G 5/04 340/945 |
| 2015/0261379 | A1 * | 9/2015 | Kneuper | G08G 5/0052 345/173 |
| 2016/0171650 | A1 * | 6/2016 | Wilson, Jr. | G08G 5/0021 701/431 |
| 2016/0225269 | A1 * | 8/2016 | Nikolajevic | B64C 27/04 |
| 2017/0076612 | A1 * | 3/2017 | Takahashi | B64D 47/08 |

OTHER PUBLICATIONS

NTSB UA93 flight animation on Google Earth (https://www.youtube.com/watch?v=vQKoIMCHq70) (Year: 2008).*
P-51 Mustang crash Reno animated flight path at Reno Sep. 2011 (https://www.youtube.com/watch?v=mBd7cXoGbAo) (Year: 2011).*

* cited by examiner

*Primary Examiner* — Thomas G Black
*Assistant Examiner* — Ce Li Li
(74) *Attorney, Agent, or Firm* — Van Pelt, Yi & James LLP

(57) ABSTRACT

An aircraft cockpit flight display system and method are disclosed. In various embodiments, an indication of a geo-location of an aircraft with which a display device is associated is received. A displayed scene that includes a graphical representation of the aircraft and a surrounding scene the content of which is determined at least in part by the geo-location is displayed via the display device.

17 Claims, 12 Drawing Sheets

AIRCRAFT COCKPIT DISPLAY AND INTERFACE

CROSS REFERENCE TO OTHER APPLICATIONS

This application claims priority to U.S. Provisional Patent Application No. 62/641,889 entitled AIRCRAFT COCKPIT DISPLAY AND INTERFACE filed Mar. 12, 2018 which is incorporated herein by reference for all purposes.

BACKGROUND OF THE INVENTION

Personal aircraft have been proposed and developed. To gain widespread use among non-pilots, a personal aircraft that is at least largely autonomous may be desired. Such an aircraft may be used to provide a recreational experience or as a mode of transportation, e.g., as a replacement for an automobile or other terrestrial mode of transportation.

An autonomous aircraft may be controlled by a flight computer configured to receive start, destination, waypoint, and/or other route information, and to use such information to generate a series of control commands to operate the aircraft's propulsion elements (e.g., vertical lift fans, forward flight propellers, etc.) and control surfaces (e.g., ailerons, elevators, flaps, rudders, etc.), sometimes referred to herein collectively as "actuators", to cause the aircraft to take off, fly to the destination (e.g., via the indicated waypoints), and land, all without human intervention.

For a non-pilot, flying in a small, personal aircraft may be an anxiety provoking experience. In the case of autonomous flight, a passenger may become concerned that the aircraft's autonomous flight control system may fail to navigate around obstacles, respond to an apparent change in conditions (e.g., weather), etc. A passenger may experience anxiety due to the absence of hand or other human-operated controls in an autonomous aircraft.

BRIEF DESCRIPTION OF THE DRAWINGS

Various embodiments of the invention are disclosed in the following detailed description and the accompanying drawings.

DETAILED DESCRIPTION

Figures 1A, 1B, 1C, 1D:
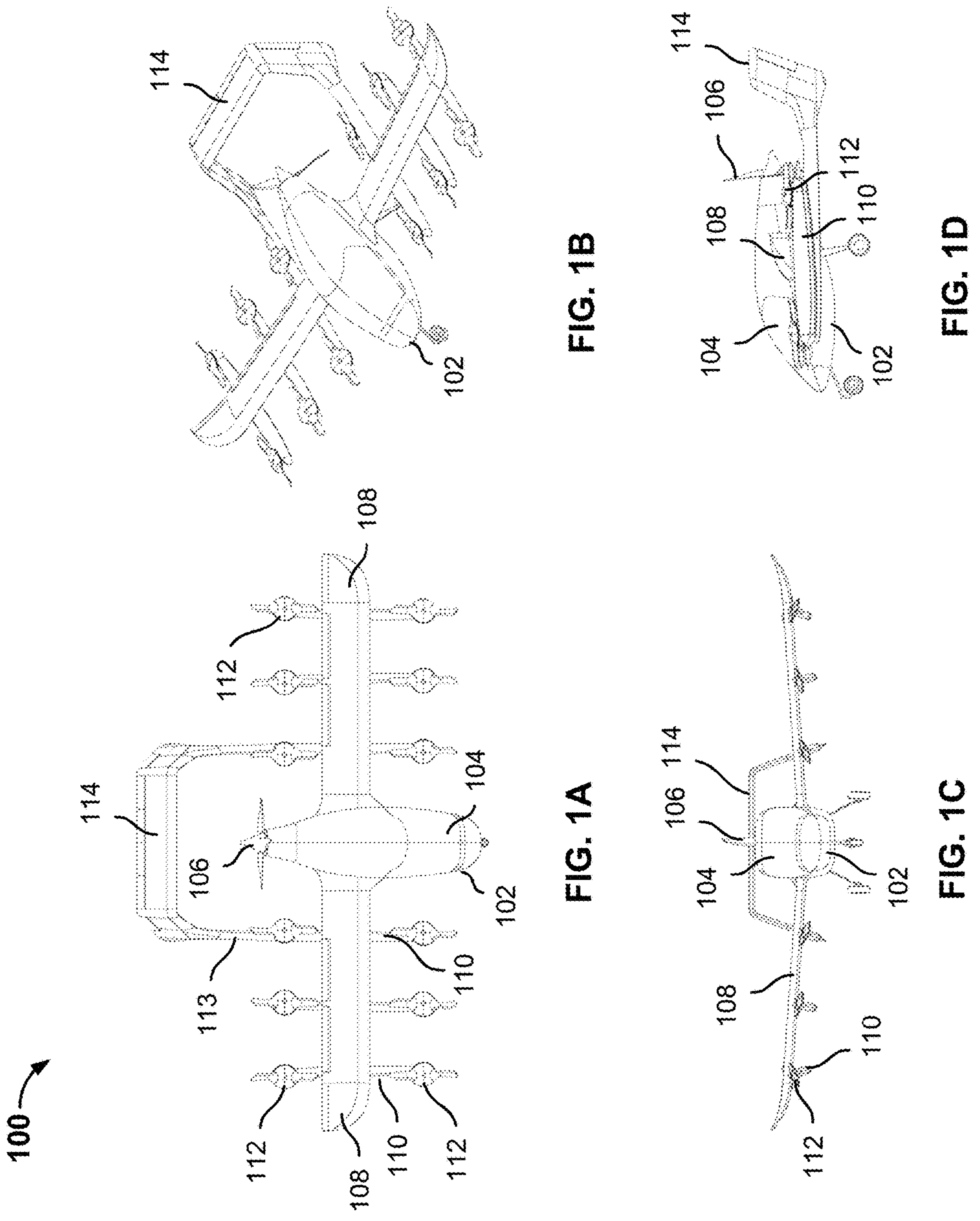
FIG. 1A is a diagram illustrating a top view of an embodiment of an aircraft comprising a cockpit display as disclosed herein.
FIG. 1B is a diagram illustrating a perspective view of the personal aircraft 100 of FIG. 1A.
FIG. 1C is a diagram illustrating a front view of the personal aircraft 100 of FIG. 1A.
FIG. 1D is a diagram illustrating a side view of the personal aircraft 100 of FIG. 1A.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An aircraft cockpit display and a system to provide such a display are disclosed. Particularly in autonomous flight modes, it is desirable to provide an aircraft cockpit display experience that informs the passenger(s) of the progress of the flight and reassures them that the aircraft is being guided successfully to its destination by the autonomous flight system. This requirement presents a number of technical challenges, including the need to update the aircraft cockpit display in real time to match what the passenger is experiencing and sensing in the course of the flight, for example as the aircraft maneuvers over, around, and/or between obstacles (e.g., mountains or other land masses, buildings, other aircraft) and as the aircraft changes its orientation in three dimensional space, e.g., relative to a plane normal to a vector normal to the ground.

Vertical takeoff and landing aircraft have been provided. In some such aircraft, electrically-powered lift fans or other rotors provide vertical lift for substantially vertical flight, e.g., for takeoff, landing, and/or hover, while one or more propellers provide thrust for forward flight.

Autonomous aircraft have been provided. In autonomous flight, a computer determines and provides actuator commands to fly the aircraft from a given start point to a desired destination. A fully autonomous aircraft may be intended to be suitable for use by a non-pilot. Some such aircraft may not include manual or other human-operable controls in the cockpit, which may tend to give some passengers anxiety associated with a sense of lack of control.

In various embodiments, an aircraft cockpit display and experience is provided. In some embodiments, a display device mounted in the aircraft cockpit is used to provide a dynamic display that depicts the aircraft and surrounding terrain in a manner that is consistent with what the passenger sees and feels during a given moment of the flight. Sensor inputs and/or data received via radio or satellite communication may be used to determine the content to be displayed. Content in various embodiments includes an animated representation of the aircraft. For example, the lift fans may be shown to be rotating during vertical flight while the propeller is shown to be rotating during forward flight. Transitions between modes of flight may also be represented via animations synchronized with the real world transition of the aircraft.

In some embodiments, the status and progress of the flight experience may be represented. For example, in some embodiments a racetrack or other representation of a planned flight and the progress of the aircraft along the planned flight path may be displayed. In some embodiments, flight status information such as airspeed, time remaining in the flight, and altitude are displayed.

FIG. 1A is a diagram illustrating a top view of an embodiment of an aircraft comprising a cockpit display as disclosed herein. In the example shown, aircraft 100 comprises a vertical takeoff and landing aircraft having a fuselage 102 that includes a cockpit 104 to accommodate a passenger. A pusher-type propeller 106 driven by an electric motor (not shown) is mounted on the aft end of the fuselage 102. Port and starboard side wings 108 are provided and each wing 108 has three underwing booms 110 mounted under the wing 108. Each boom 110 has one electrically-powered lift fan 112 mounted on each of the forward and aft ends of the boom 110, for a total of twelve lift fans 112 in this example. The inboard-most booms 110 on each side of the fuselage 102 extend aft via boom extensions 113 to support a tail structure 114 comprising a vertical tail fin portion extending upward from the respective boom extensions 113 and a horizontal tail plane 114 spanning between the vertical tail fin portions.

FIG. 1B is a diagram illustrating a perspective view of the personal aircraft 100 of FIG. 1A.

FIG. 1C is a diagram illustrating a front view of the personal aircraft 100 of FIG. 1A.

FIG. 1D is a diagram illustrating a side view of the personal aircraft 100 of FIG. 1A.

In various embodiments, aircraft 100 of FIGS. 1A-1D is configured to fly in an autonomous mode in which a flight control computer determines and provides actuator commands to control the respective lift fans 112, propeller 106, and control surfaces (e.g., elevators, ailerons, rudders, etc.) of the aircraft 100 to fly the aircraft from a starting location to a destination. In some embodiments, autonomous flight is provided for the entire duration and all phases of a flight experience, including one or more of vertical (or substantially vertical) takeoff, transition to forward flight, forward flight, transition to vertical (or substantially vertical) flight, and vertical (or substantially vertical) landing. In various embodiments, an aircraft cockpit display and experience as disclosed herein is provided for all or part of such a flight.

Figure 2A:
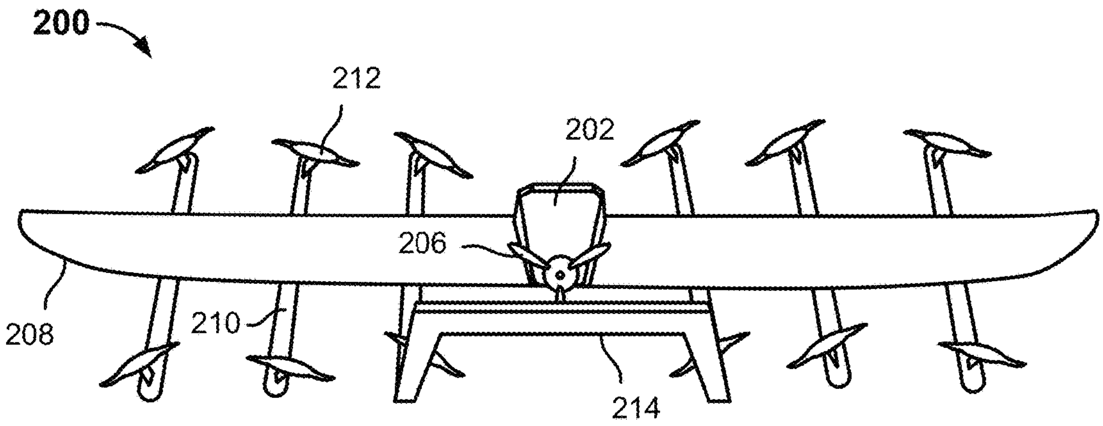
FIG. 2A is a diagram illustrating an example of an aircraft avatar in a state in which all rotors and propellers are stopped in an embodiment of an aircraft cockpit display.

FIG. 2A is a diagram illustrating an example of an aircraft avatar in a state in which all rotors and propellers are stopped in an embodiment of an aircraft cockpit display. In the example shown, avatar 200 comprises a graphic representation of the aircraft as viewed by a bird, drone, or other hypothetical observer from a position above and behind the aircraft. The avatar 200 in this example corresponds to a vertical takeoff/landing (VTOL) aircraft, such as the aircraft 100 of FIGS. 1A-1D. The avatar 200 includes in this example an aircraft comprising a fuselage 202, rear (also known as a "pusher" style) propeller 206, wings 208, booms 210, lift fans 212, and tail structure 214. In the example shown in FIG. 2A, the aircraft is shown in a state in which the lift fans 212 and the propeller 206 are stopped, e.g., while the aircraft is on the ground prior to or after flight.

Figure 2B:
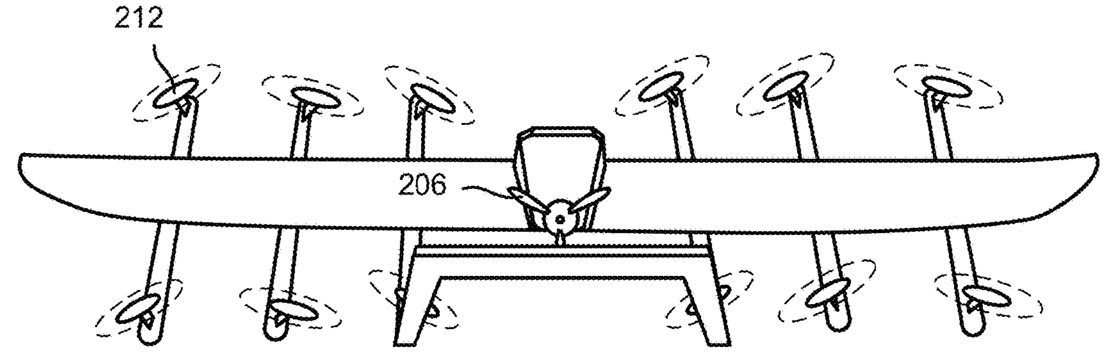
FIG. 2B is a diagram illustrating the aircraft avatar of FIG. 2A in a vertical flight state in which lift fans are rotating and the rear propeller is stopped.

FIG. 2B is a diagram illustrating the aircraft avatar of FIG. 2A in a vertical flight state in which lift fans are rotating and the rear propeller is stopped. In the state shown, lift fans 212 are shown to be rotating at high speed, as opposed to stopped as in FIG. 2A. In some embodiments, an animation sequence is displayed to illustrate the transition from the stopped state as shown in FIG. 2A to the vertical flight state shown in FIG. 2B. For example, the lift fans 212 start in the stopped position shown in FIG. 2A and a sequence of images in which the respective lift fans 212 are rotated, slowly at first, through a sequence of positions simulating rotation, culminating in a display in which the lift fans 212 are shown to rotate more rapidly, as in the example shown (statically) in FIG. 2B.

Figure 2C:
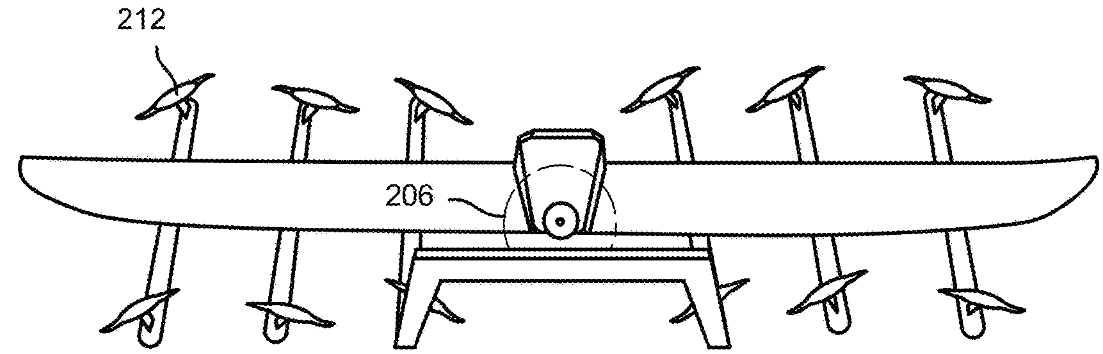
FIG. 2C is a diagram illustrating the aircraft avatar of FIG. 2A in a forward flight state in which lift fans are stopped and the rear propeller is rotating.

FIG. 2C is a diagram illustrating the aircraft avatar of FIG. 2A in a forward flight state in which lift fans are stopped and the rear propeller is rotating. In the example shown, the lift fans 212 are stopped but the propeller 206 is rotated at high speed, as in forward flight. In some embodiments, an animation sequence is displayed to illustrate the transition from the vertical flight state as shown in FIG. 2B to the forward flight state shown in FIG. 2C. For example, the lift fans 212 start in the rotating mode as shown in FIG. 2B while the propeller 206 is shown stopped as in FIG. 2B, and a sequence of images in which the respective lift fans 212 slow and then stop while the propeller 206 begins to rotate and continues to increase in speed of rotation until rotating at high speed, as shown statically in FIG. 2C.

In some embodiments, an animation sequence may be displayed during a transition from the forward flight state shown in FIG. 2C to the vertical flight state shown in FIG. 2B, for example prior to vertical landing or entering a hover. For example, the lift fans 212 may begin to rotate and come to speed while the propeller 206 slows and then comes to a stop. Likewise, in some embodiments, an animation sequence may be displayed during a transition from the vertical flight state shown in FIG. 2B to the stopped flight state shown in FIG. 2A, for example in connection with a landing. For example, the lift fans 212 may be shown to being to slow and then come to a stop.

In various embodiments, animation sequences illustrating transitions between flight modes (stopped, vertical, and forward, as shown in FIGS. 2A, 2B, and 2C, respectively) are synchronized with the corresponding real world transition of the aircraft in which an aircraft cockpit display as disclosed herein is provided. In some embodiments, the (autonomous) flight control system receives and/or generates feedback information reflecting the position, speed of rotation, and/or other state of the lift fans 212, propeller 206, and/or other actuators, and the feedback information is used by the aircraft cockpit display system to update and/or synchronize animations with corresponding real world state information.

Figure 3:
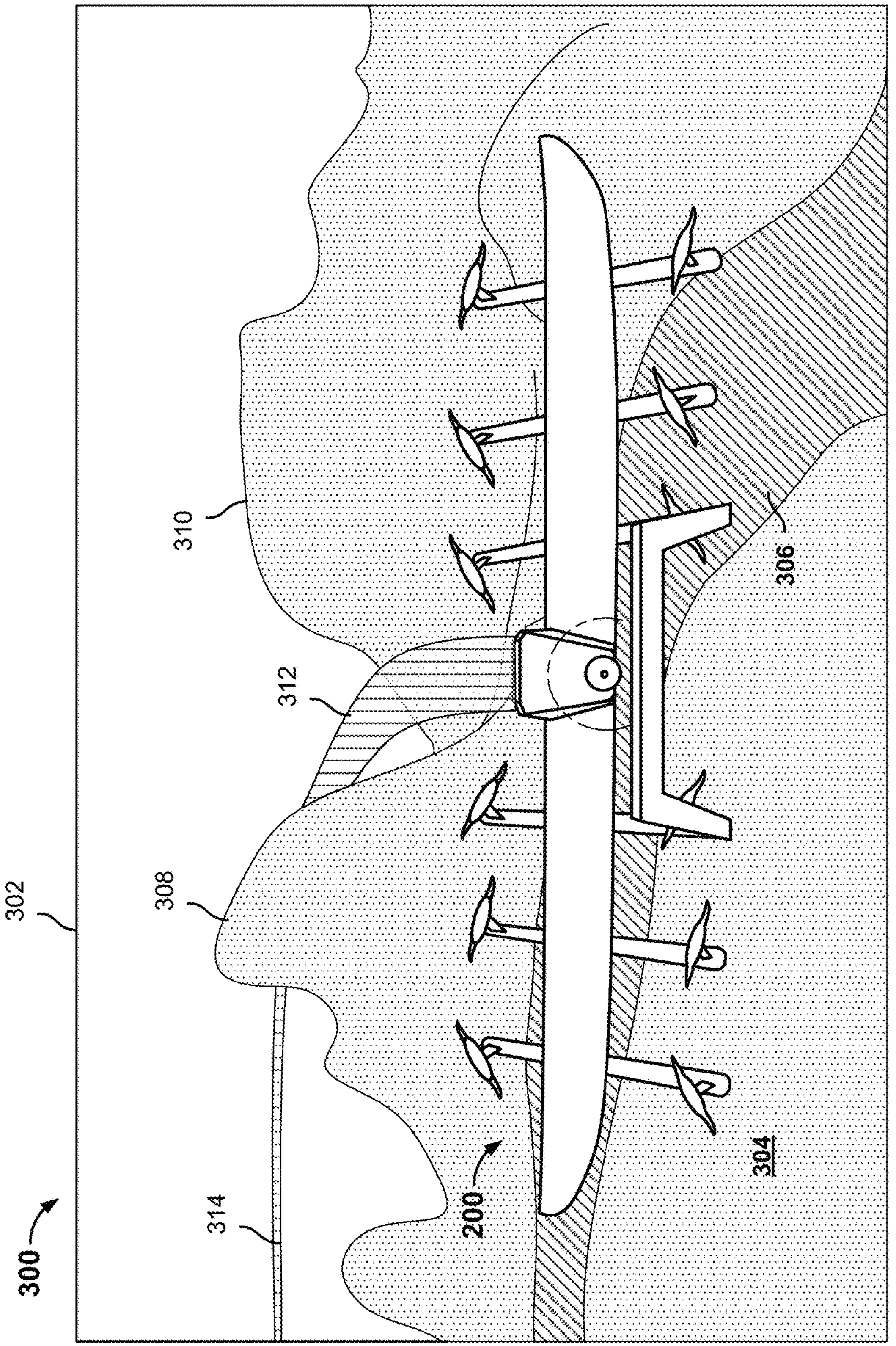
FIG. 3 is a diagram illustrating an embodiment of an aircraft cockpit display.

FIG. 3 is a diagram illustrating an embodiment of an aircraft cockpit display. In various embodiments, the aircraft cockpit display 300 of FIG. 3 is provided via a display device 302 mounted in an aircraft cockpit, such as cockpit 104 of the aircraft shown in FIGS. 1A through 1D. In the example shown, display 300 includes aircraft avatar 200 in the state shown in FIG. 2C (forward flight) flying through a dynamically updated scene that includes terrain 304 with river or stream 306 running through it, over which the aircraft represented by avatar 200 and in which the display device 302 is mounted is flying and/or is about to fly, and mountains or hills 308 and 310 in the near distance.

In various embodiments, the display 300 is updated continuously as the aircraft represented by avatar 200 travels through the real world airspace and terrain depicted the displayed scene. Sensor inputs, such as global positioning system (GPS) or other location data, light detection and ranging (LIDAR), and/or other sensors, are used to synchronize the displayed scene with the real world environment through which the aircraft is travelling. In some embodiments, contour lines and/or meshes are overlaid on the terrain to illustrate the topology of the terrain over which the aircraft is flying.

In various embodiments, an aircraft cockpit display system generates, updates, and maintains synchronization between the display 300 and the real world environment through which the aircraft is travelling. The aircraft cockpit display system receives aircraft position, posture (e.g., orientation in three dimensional space relative to the ground), and other information, and uses a set of visual content assets, e.g., graphical images, animation sequences, terrain maps, etc., to provide and update the display 300.

In the example shown in FIG. 3, the display 300 includes a ribbon-like upcoming flight path display 312, which represents the expected flight of the aircraft through the space/terrain displayed in the display 300. In the example shown, the ribbon-like upcoming flight path display 312 is partially transparent, allowing the terrain below and/or beyond the ribbon-like upcoming flight path display 312 to be seen, e.g., mountain or hill 310 in this example. In some embodiments, the ribbon-like upcoming flight path display 312 is shown to twist right or left in regions associated with a change in course, e.g., to enable a passenger via the display 300 to anticipate the physical experience and sensations associated with the aircraft banking to complete the turn. In some embodiments, the extent of twist is determined at least in part by the aircraft cockpit display system based on a model of the aircraft and its flight and dynamically determined and/or updated factors such as current airspeed, airspeed at which the turn is expected (e.g., based on autonomous flight system command data) to be executed, etc. In the example shown, the ribbon-like upcoming flight path display 312 tapers to a narrow segment 314 at a far end of the ribbon-like upcoming flight path display 312, providing to a viewer of the display 300 a visual cue that the portion of the flight path associate with the narrow segment 314 will not be traversed for some time.

In various embodiments, the aircraft avatar 200 as shown in FIG. 3 is maintained in a level position as displayed, e.g., with the horizontal axis/plane of the aircraft avatar 200 remaining parallel with the bottom edge of the display device 302, while the aircraft orientation changes, e.g., through pitch and roll. In various embodiments, the displayed scene is tilted and/or rotated based on inputs from sensors and/or the flight control system so that the scene as displayed via the display 300 appears to a passenger secured in a seat in the cockpit as the real world appears through the cockpit window. For example, the horizon as displayed is be displayed at angle that matches the angle at which the horizon appears to the passenger as view through the cockpit window as the aircraft banks to execute a turn.

Figure 4A:
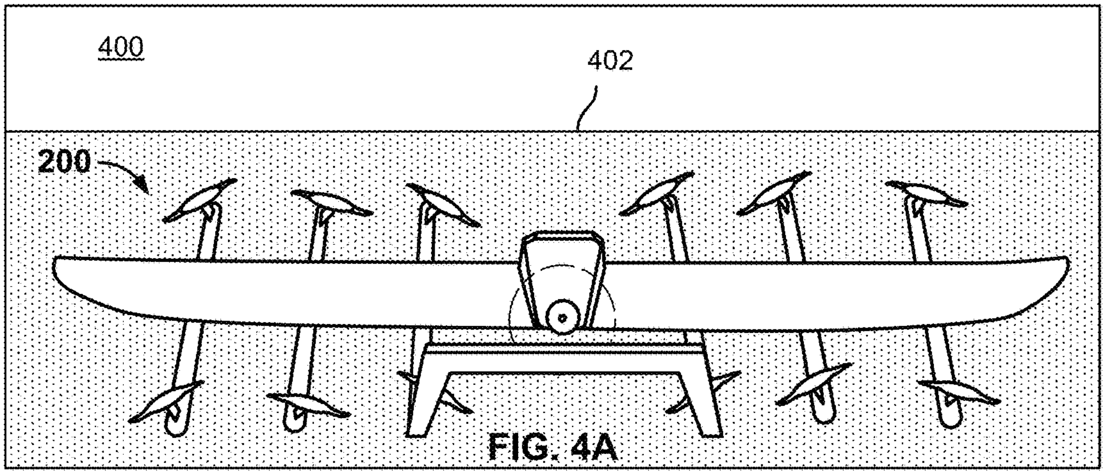
FIG. 4A is a diagram illustrating an embodiment of an aircraft cockpit display in a state associated with level flight.

FIG. 4A is a diagram illustrating an embodiment of an aircraft cockpit display in a state associated with level flight. In the example shown, the aircraft avatar 200 in the forward flight state shown in FIG. 2C is shown flying level with the ground through a scene displayed via display device 400. The horizon 402 is shown to be substantially parallel with the aircraft and the bottom edge of display device 400.

Figure 4B:
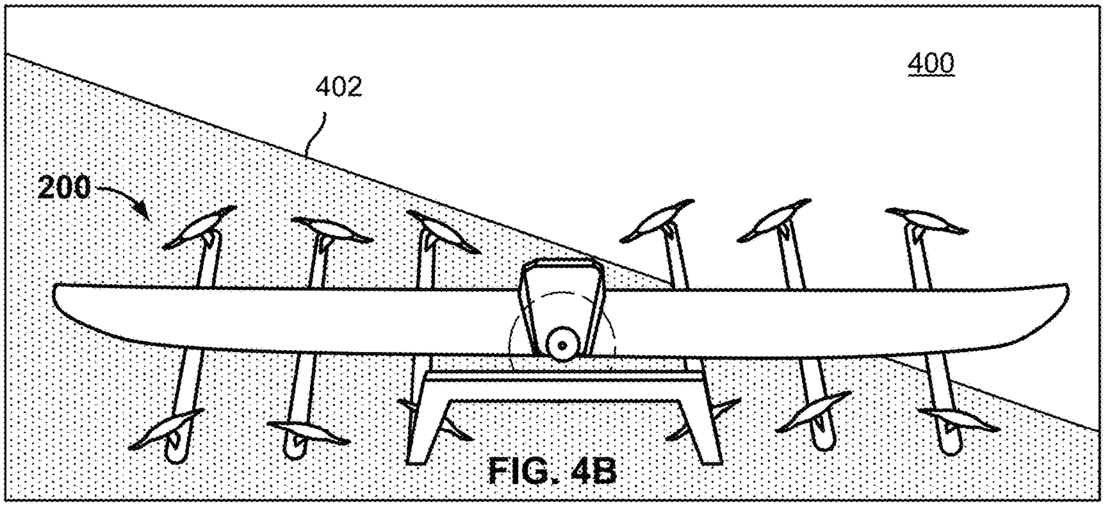
FIG. 4B is a diagram illustrating an embodiment of an aircraft cockpit display in a state associated with a maneuver in which the aircraft is banking left.

FIG. 4B is a diagram illustrating an embodiment of an aircraft cockpit display in a state associated with a maneuver in which the aircraft is banking left. In the example shown, the aircraft avatar 200 remains in the same position and orientation within and relative to the display device 200, but the displayed scene is rotated to the right, as indicated by the angle at which the horizon 402 is displayed. The scene displayed as shown in FIG. 4B in various embodiments is synchronized to the degree to which the aircraft has banked to the left to execute a left turn maneuver.

Figure 4C:
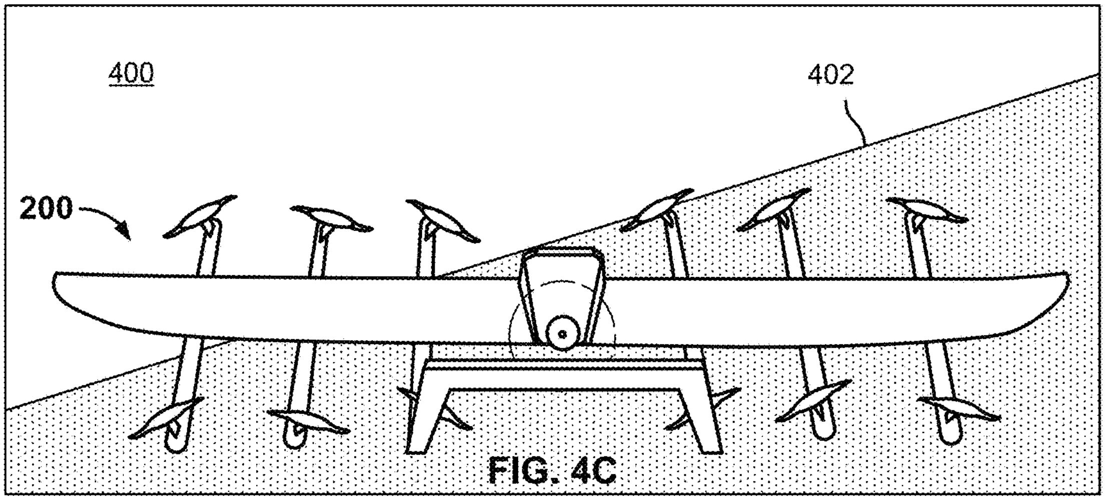
FIG. 4C is a diagram illustrating an embodiment of an aircraft cockpit display in a state associated with a maneuver in which the aircraft is banking right.

FIG. 4C is a diagram illustrating an embodiment of an aircraft cockpit display in a state associated with a maneuver in which the aircraft is banking right. In the example shown, the aircraft avatar 200 remains in the same position and orientation within and relative to the display device 200, but the displayed scene is rotated to the left, as indicated by the angle at which the horizon 402 is displayed. The scene displayed as shown in FIG. 4C in various embodiments is synchronized to the degree to which the aircraft has banked to the right to execute a right turn maneuver.

In various embodiments, rotated the displayed scene while maintain the position of the aircraft avatar within the display device matches the displayed virtual experience with the physical world experience of the passenger(s). For example, a passenger seat belted into a seat that remains level relative to the horizontal plane of the aircraft and the horizontal edges of the display 400 would feel no change in their position relative to the aircraft or display device 400 but would see the real world scene rotate in a direction opposite the turn, as in the examples shown in FIGS. 4B and 4C.

Figure 5A:
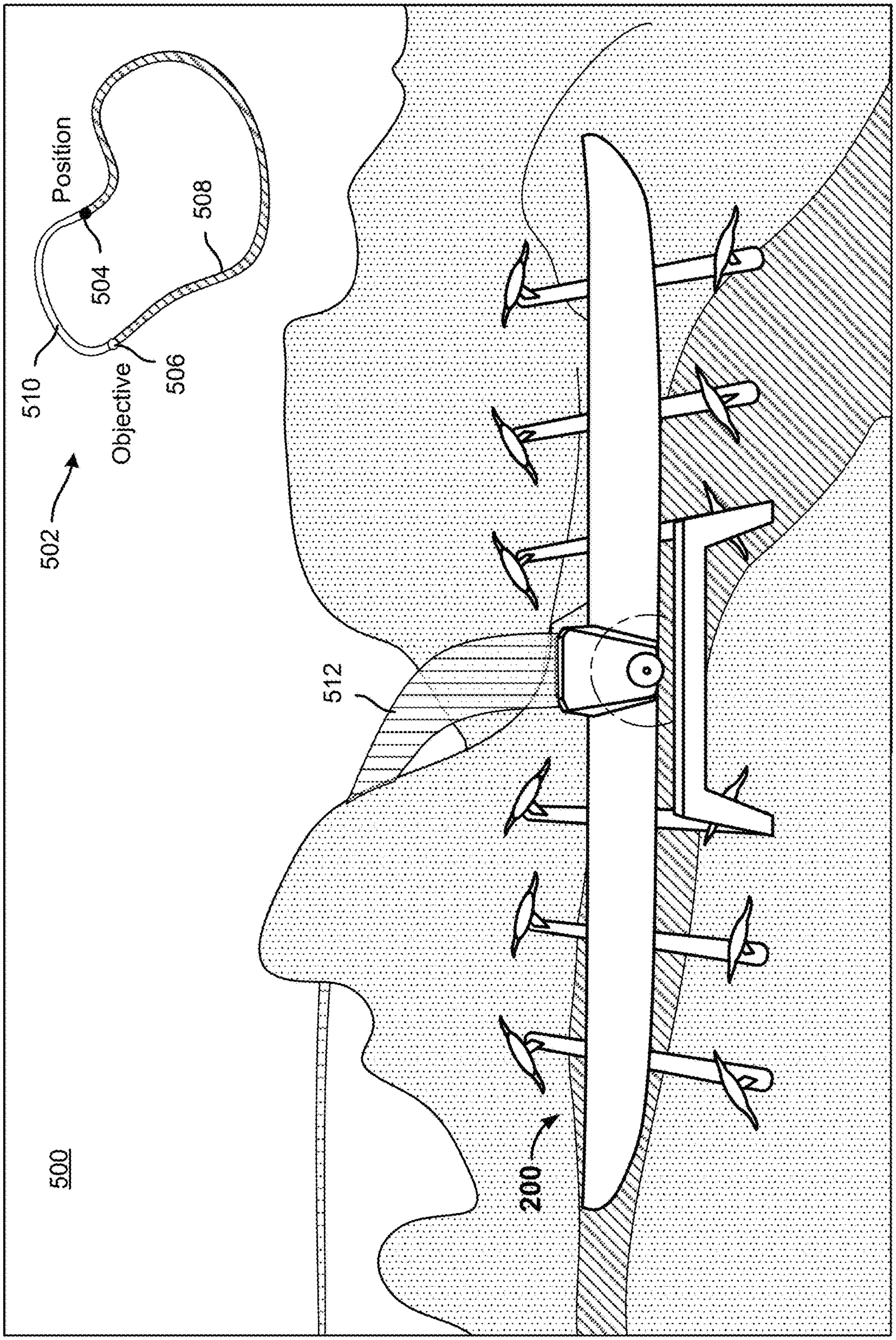
FIG. 5A is a diagram illustrating an embodiment of an aircraft cockpit display that includes a flight progress display portion.

FIG. 5A is a diagram illustrating an embodiment of an aircraft cockpit display that includes a flight progress display portion. In the example shown, the aircraft cockpit display 300 of FIG. 3 has been augmented to provide a display 500 in which a flight progress display portion 502 is included, in this example in the upper right corner of display 500. In this example, the current position indicator 504 indicating the current position of the aircraft along a closed (i.e., starts and stops at the same point) flight path comprises a solid black circle, and the start/stop point 506, also labeled "objective" in FIG. 5A, is represented by a circle with white fill color. The flight path segment 508 through which the aircraft has already flown is indicated by a color, pattern, or other attribute that contrasts with the flight segment path 510 representing the portion of the overall flight path that remains to be flown. In some embodiments, the flight segment path 510 representing the portion of the overall flight path that remains to be flown is displayed using a same color, texture, etc. of the ribbon used to show the flight path ahead of the aircraft, such as ribbon 512 in the example shown, to provide a visual cue to the user as to which part of the flight progress display portion 502 indicates the portion remaining in the trip. In various embodiments, the current position indicator 504 and segments 508 and 510 are updated continuously as the aircraft makes progress along the flight path. In various embodiments, knowledge and awareness of where one is along the flight path may be reassuring to a passenger experiencing an autonomous flight.

Figure 5B:
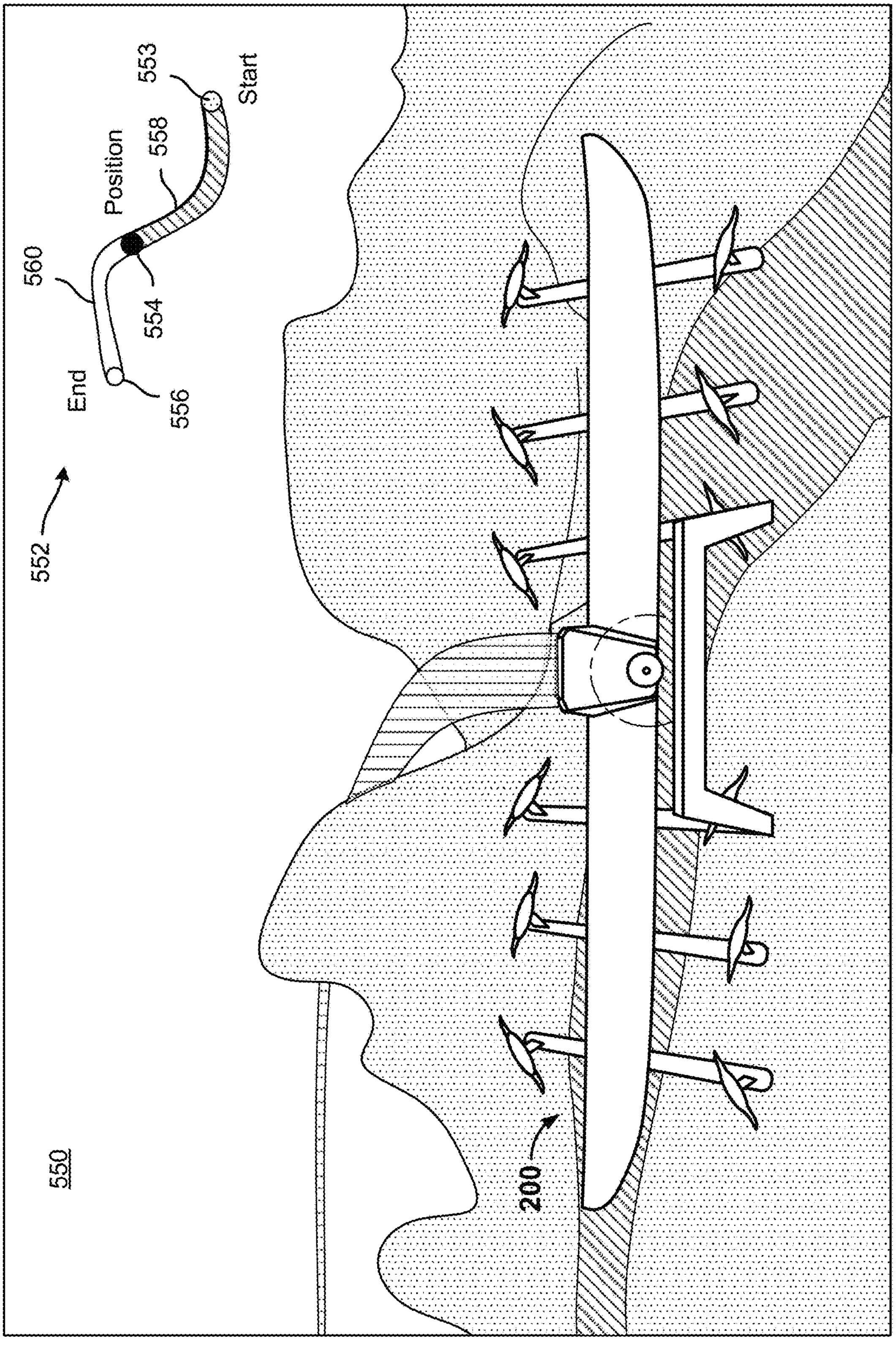
FIG. 5B is a diagram illustrating an embodiment of an aircraft cockpit display that includes a flight progress display portion.

FIG. 5B is a diagram illustrating an embodiment of an aircraft cockpit display that includes a flight progress display portion. In the example shown, the aircraft cockpit display 300 of FIG. 3 has been augmented to provide a display 550 in which a flight progress display portion 552 is included. In the example shown, a flight path that starts and ends at different locations is represented. The current position indicator 554 indicates the current position of the aircraft along an open (i.e., starts and stops at different points) flight path from a start location 553 to an end location 556. The flight path segment 558 through which the aircraft has already flown is indicated by a color, pattern, or other attribute that contrasts with the flight segment path 560 representing the portion of the overall flight path that remains to be flown. In various embodiments, the current position indicator 554 and segments 558 and 560 are updated continuously as the aircraft makes progress along the flight path. In various embodiments, knowledge and awareness of where one is along the flight path may be reassuring to a passenger experiencing an autonomous flight.

Figure 6A:
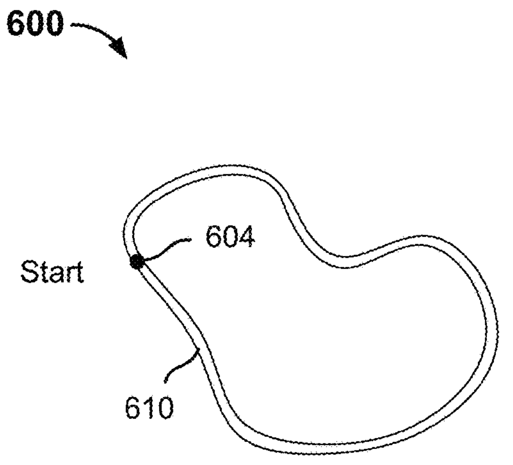
FIG. 6A is a diagram illustrating an example of a flight progress display portion in a pre-flight or start state in an embodiment of an aircraft cockpit display.

FIG. 6A is a diagram illustrating an example of a flight progress display portion in a pre-flight or start state in an embodiment of an aircraft cockpit display. In the example shown, flight progress display portion 600 shows the current position indicator 604 at the start location and the entire track has a color, fill, etc., or lack thereof, associated with a remaining segment 610 of the flight path to be flown.

Figure 6B:
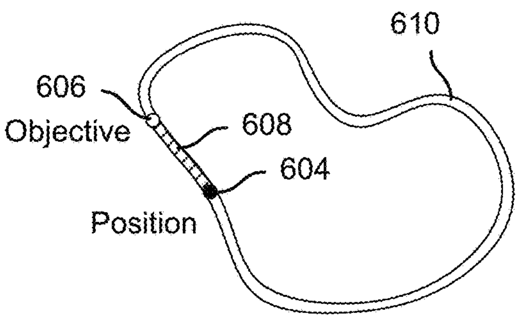
FIG. 6B is a diagram illustrating an example of a flight progress display portion in an early phase of flight state in an embodiment of an aircraft cockpit display.

FIG. 6B is a diagram illustrating an example of a flight progress display portion in an early phase of flight state in an embodiment of an aircraft cockpit display. In the state shown in FIG. 6B, the position indicator 604 has advanced and an "objective" or end indicator 606 is shown at the start/stop location. A completed segment 608 is displayed between the start/end location 606 and the current position indicator 604, and the remainder of the flight path is displayed as a remaining segment 610.

Figure 6C:
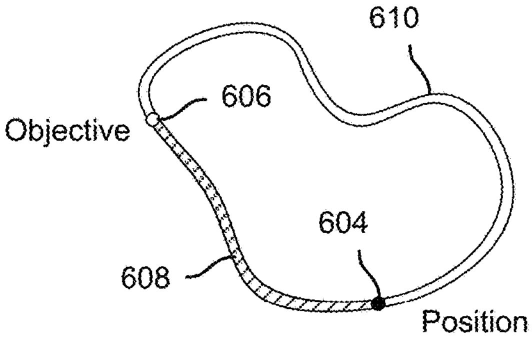
FIG. 6C is a diagram illustrating an example of a flight progress display portion in a mid-range phase of flight state in an embodiment of an aircraft cockpit display.

FIG. 6C is a diagram illustrating an example of a flight progress display portion in a mid-range phase of flight state in an embodiment of an aircraft cockpit display. In the state shown in FIG. 6C, the position indicator 604 has advanced along the displayed track, indicating progress in the real world flight along the flight path, and the completed segment 608 is longer while the remaining segment 610 is shorter.

Figure 6D:
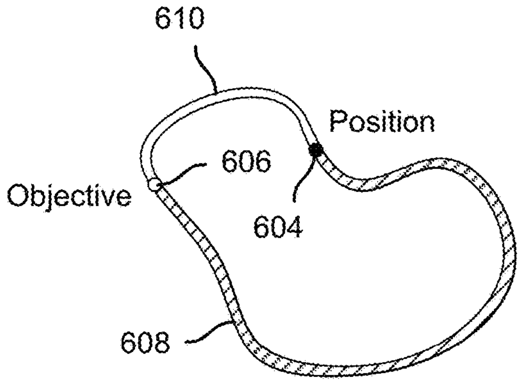
FIG. 6D is a diagram illustrating an example of a flight progress display portion in a later stage of flight state in an embodiment of an aircraft cockpit display.

FIG. 6D is a diagram illustrating an example of a flight progress display portion in a later stage of flight state in an embodiment of an aircraft cockpit display. In the state shown in FIG. 6D, the aircraft is nearer to the end of the flight, as indicated by the position of the current position indicator 604 and the respective lengths of the completed segment 608 and remaining segment 610.

In various embodiments, the progression illustrated by FIGS. 6A through 6D would be displayed in a corresponding location within an aircraft cockpit display as disclosed herein, reflecting and keeping the passenger(s) apprised of the real world progress of a flight along the planned flight path.

In some embodiments, a progress indicator associated with progress other than along a closed flight path, e.g., progress of an operation or transition such as takeoff or landing, may be included in an aircraft cockpit display as disclosed herein.

Figure 7A:
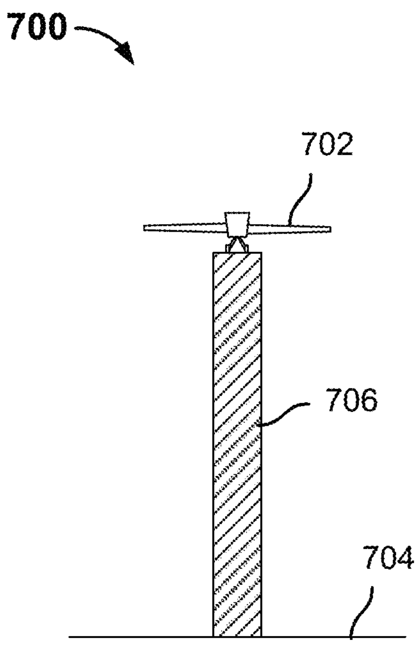
FIG. 7A is a diagram illustrating an example of a vertical landing progress display portion of an embodiment of an aircraft cockpit display.

FIG. 7A is a diagram illustrating an example of a vertical landing progress display portion of an embodiment of an aircraft cockpit display. In the example shown, vertical landing progress display 700 includes a graphical representation 702 of an aircraft positioned above a line 704 representing the ground with a remaining altitude segment 706 fully filling a progress bar interposed between the graphical representation 702 and the line 704. In some embodiments, the vertical landing progress display 700 is displayed in the state shown in FIG. 7A at the beginning of a landing operation. For example, the vertical landing progress display 700 may be displayed in the state shown in FIG. 7A once the aircraft has transitioned from forward flight to vertical flight in preparation for landing. In various embodiments, an autonomous or other flight control system of the aircraft is configured to provide event or other data indicating the beginning of a landing operation, the completion of a transition to vertical flight, the commencement of descent in connection with landing, and/or other event or operational data to an aircraft cockpit display system configured to provide the vertical landing progress display 700 in connection with landing.

Figure 7B:
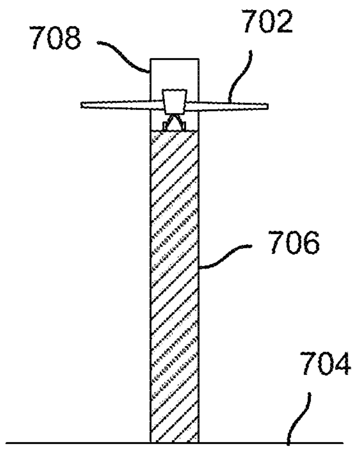
FIG. 7B is a diagram illustrating an example of a vertical landing progress display portion showing an extent of descent in an embodiment of an aircraft cockpit display.

FIG. 7B is a diagram illustrating an example of a vertical landing progress display portion showing an extent of descent in an embodiment of an aircraft cockpit display. In the example shown, the graphical representation 702 of the aircraft is shown at a position of progress along the progress bar. In the state shown, the remaining altitude segment 706 has become smaller, e.g., in proportion to remaining altitude as indicated by aircraft sensors and/or other data sources, such as an aircraft flight computer, and the portion of the descent that has been complete is indicated by a completed descent segment 708.

Figure 7C:
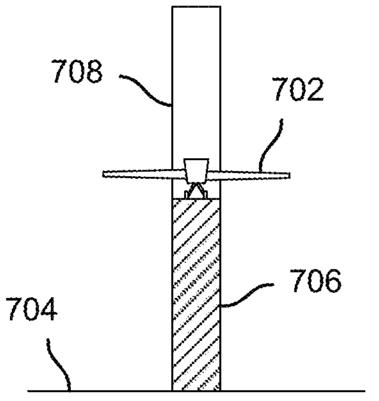
FIG. 7C is a diagram illustrating an example of a vertical landing progress display portion showing an extent of descent in an embodiment of an aircraft cockpit display.

FIG. 7C is a diagram illustrating an example of a vertical landing progress display portion showing an extent of descent in an embodiment of an aircraft cockpit display. In the state shown, the graphical representation 702 of the aircraft is shown nearer to the ground (as compared to FIGS. 7A and 7B), and the remaining altitude segment 706 has become smaller still (as compared to FIGS. 7A and 7B) while the completed descent segment 708 is larger.

Figure 7D:
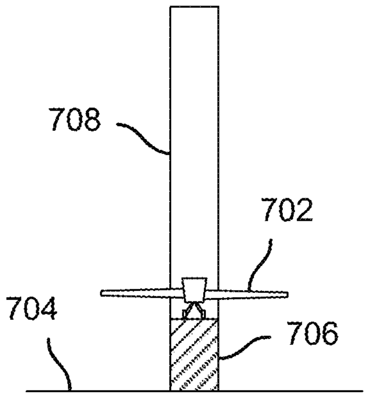
FIG. 7D is a diagram illustrating an example of a vertical landing progress display portion showing an extent of descent in an embodiment of an aircraft cockpit display.

FIG. 7D is a diagram illustrating an example of a vertical landing progress display portion showing an extent of descent in an embodiment of an aircraft cockpit display. In the state shown, the graphical representation 702 of the aircraft is shown very near the ground, and the remaining altitude segment 706 has become quite smaller while the completed descent segment 708 occupies most of the progress bar.

Figure 8:
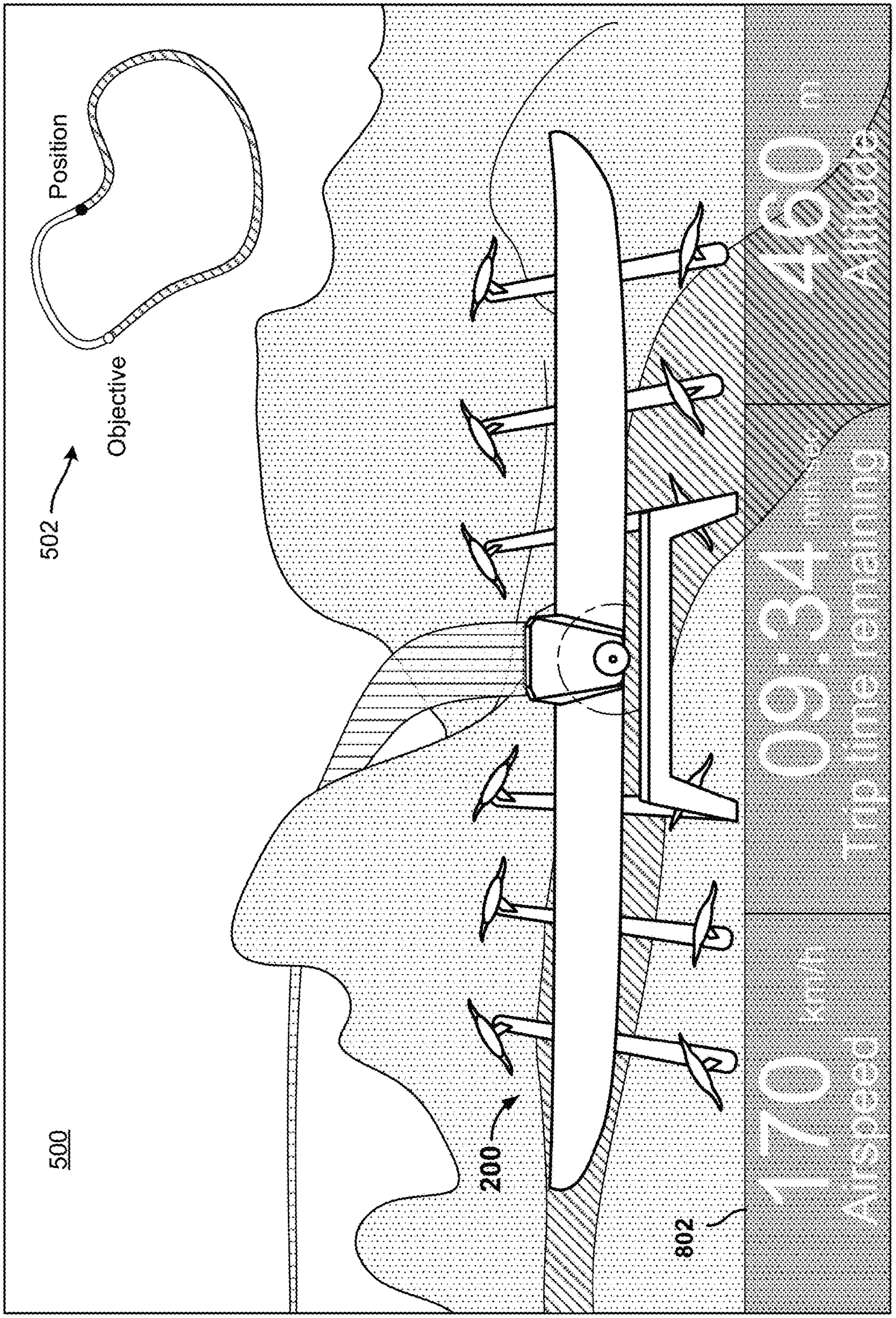
FIG. 8 is a diagram illustrating an embodiment of an aircraft cockpit display.

FIG. 8 is a diagram illustrating an embodiment of an aircraft cockpit display. In the example shown, a display similar in various respects to the display 500 shown in FIG. 5 has been augment with a flight metrics display region 802 in which data reflecting the state and/or progress of the flight is displayed. In the example shown, the airspeed, trip time remaining, and altitude are displayed. In other embodiment, different and/or additional information may be displayed.

Figure 9:
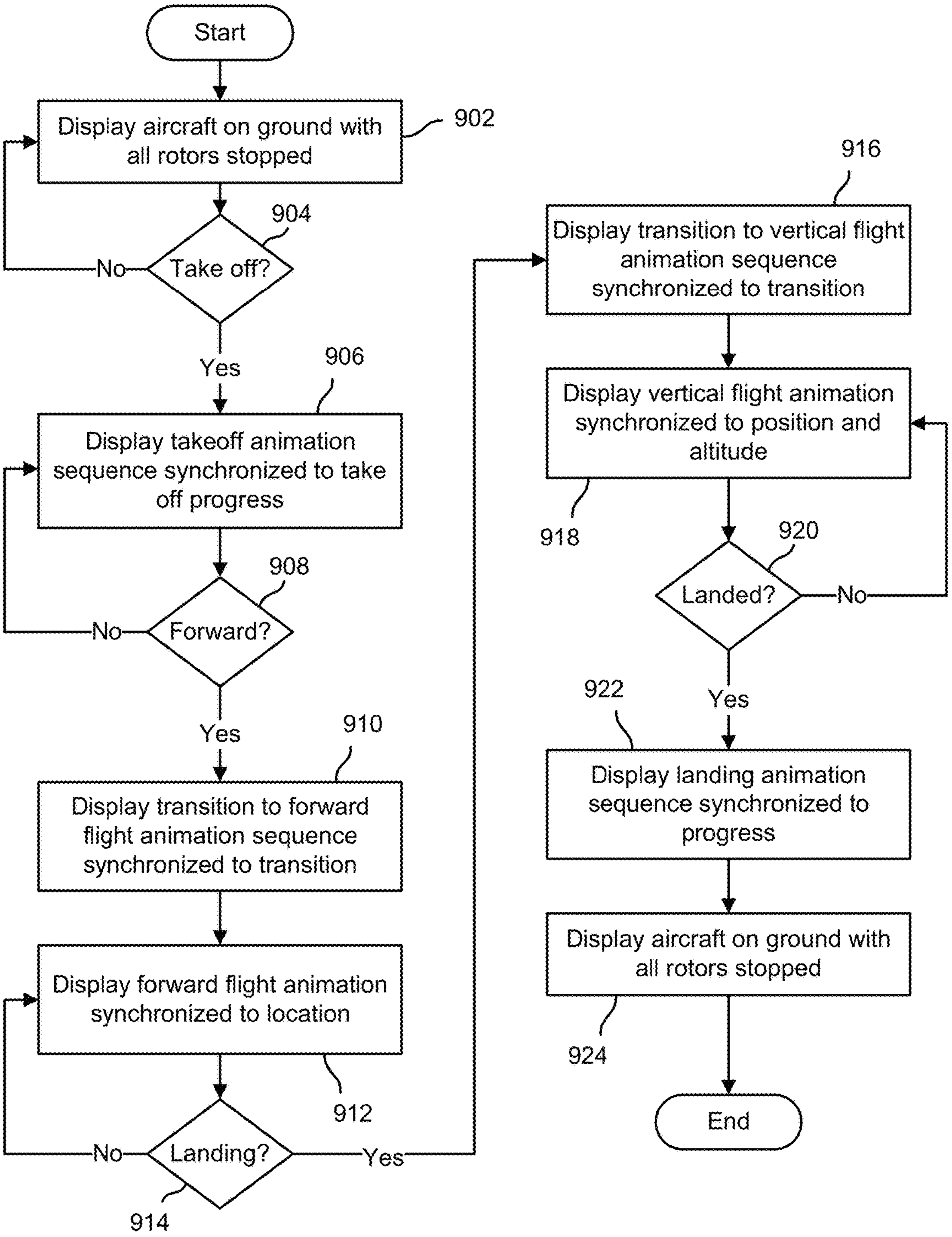
FIG. 9 is a flow chart illustrating an embodiment of a process to provide a cockpit display.

FIG. 9 is a flow chart illustrating an embodiment of a process to provide a cockpit display. In various embodiments, the process of FIG. 9 is implemented by an aircraft cockpit display system. For example, the process of FIG. 9 may be implemented in the form of software instructions which when executed by a processor cause the processor to perform the process of FIG. 9. In the example shown, at 902, initially an aircraft is displayed in a static state, on the ground, with all rotors and propellers stopped. Upon receiving an indication of takeoff, at 904, one or more animation sequences are displayed, at 906, synchronized with actual takeoff progress in the real world. For example, a first animation sequence may be displayed to show the vertical lift fans (e.g., lift fans 212 in the example shown in FIG. 2A) begin to rotate and come up to speed (e.g., to achieve the state shown in FIG. 2B). A second animation sequence may be displayed to show the aircraft lifting off the ground and climbing to a target altitude above a displayed scene representing the space and terrain through/over which the aircraft is about to fly.

Upon receiving an indication of a real world transition to forward flight, at 908, an animation sequence is displayed at 910 to show a transition from vertical flight to forward flight, such as a transition from the state shown in FIG. 2B to the state shown in FIG. 2C. The animation is synchronized to actual progress of the real world transition of the aircraft to forward flight. As the aircraft continues in forward flight in the real world, the aircraft cockpit display is updated continuously to display, at 912, a virtual scene and flight track synchronized to the actual location and orientation of the aircraft in the real world, see, e.g., FIGS. 3, 5, and 8.

Upon receiving an indication of landing, at 914, an animation sequence showing a transition from forward flight to vertical flight is shown at 916. A vertical flight animation synchronized to position (e.g., geo-location), altitude, and aircraft orientation is displayed at 918 as the aircraft descends. For example, in some embodiments the displayed scene is updated continuously to match the angle of view the passenger experiences at a given altitude. In some embodiments, a descent progress display portion is displayed as the aircraft descends, as in FIGS. 7A through 7D.

Once the aircraft approaches the final landed state, at 920, a final landing animation sequence synchronized to progress and/or descent is shown, at 922, and once the aircraft is landed the aircraft is shown at 924 on the ground with all rotors stopped.

Figure 10:
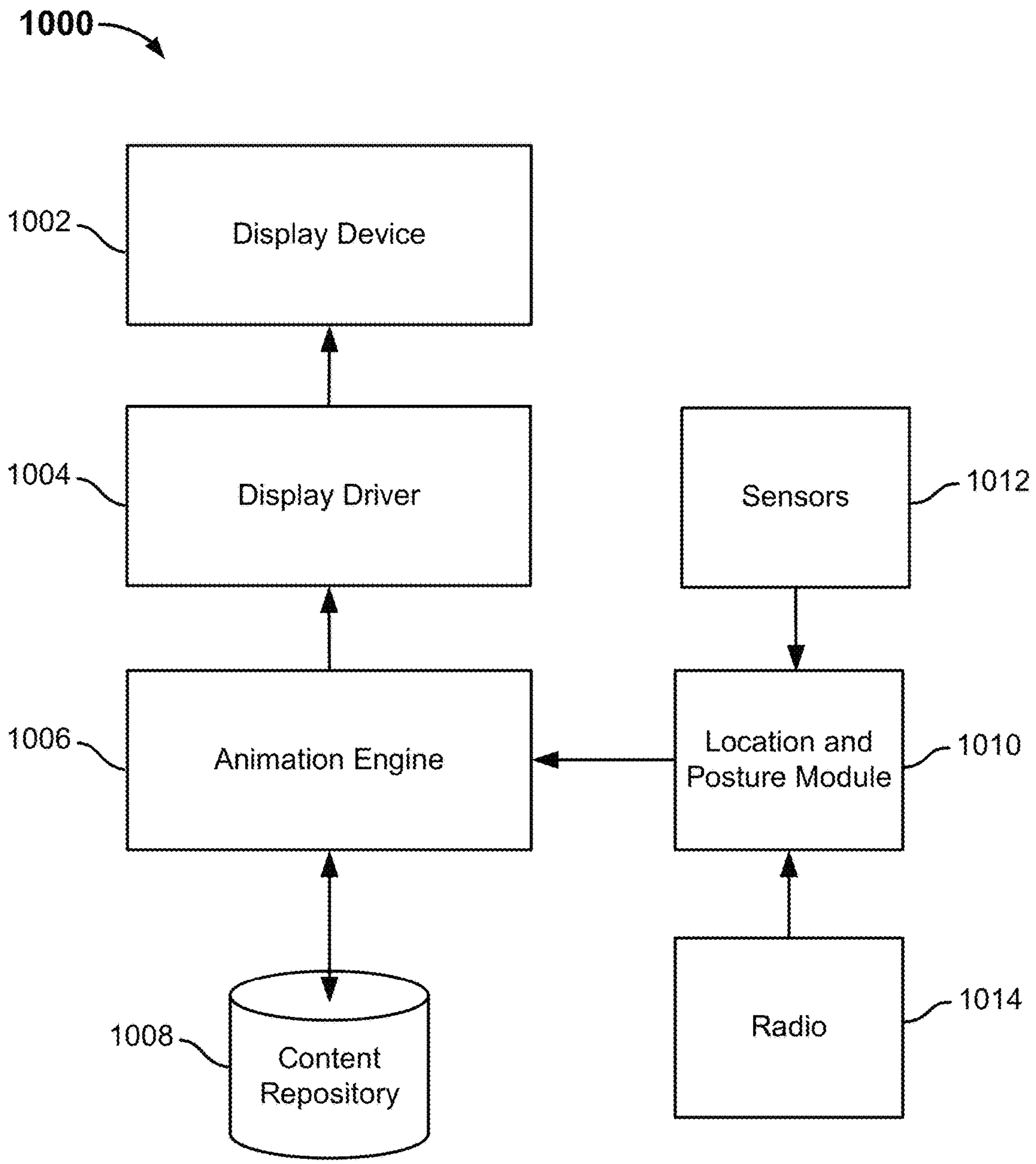
FIG. 10 is a block diagram illustrating an embodiment of a system to provide an aircraft cockpit display.

FIG. 10 is a block diagram illustrating an embodiment of a system to provide an aircraft cockpit display. In various embodiments, the aircraft cockpit display system 1000 of FIG. 10 provides a cockpit display as shown in FIGS. 3, 5, and 8, for example. In some embodiments, the aircraft cockpit display system 1000 implements the process of FIG. 9.

In the example shown, the aircraft cockpit display system 1000 includes a display device 1002 mounted in an aircraft cockpit in a position such that the display device 1002 is visible to a passenger secured in a seat opposite the display device 1002. A display driver 1004 provides signals to display device 1002 to control the images and sequences displayed on display device 1002, under the control of animation engine 1006. Animation engine uses visual content assets, e.g., images, videos, animation sequence data, etc., stored in a content repository 1008 to provide via display driver 1004 and display device 1002 aircraft cockpit displays as disclosed herein. Animation engine 1006 receives aircraft location and posture data (e.g., orientation in three dimensional space, relative to the ground/horizontal) from a location and posture module 1010, which determines aircraft location, posture, and other information from sensor data received from onboard sensors 1012 and/or data received via radio 1014 and/or other communications from sources remote from the aircraft, such as a control station or tower.

Examples of sensors 1012 include, without limitation, GPS, airspeed, altimeter, LIDAR, radar, infrared, accelerometer, or other sensors.

Figure 11:
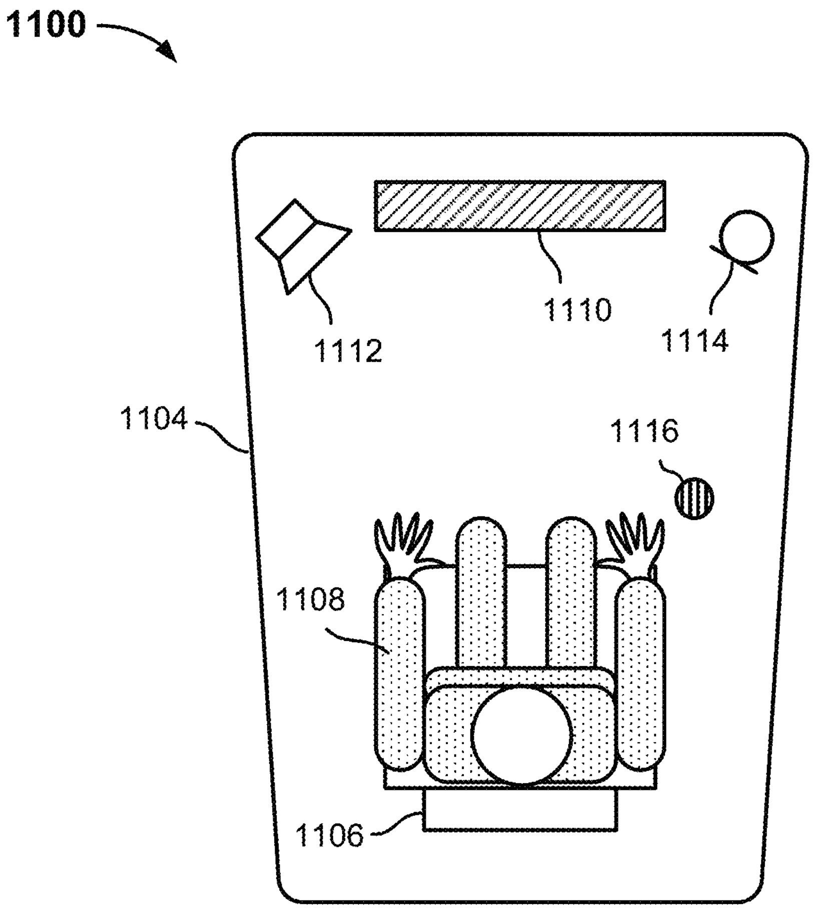
FIG. 11 is a diagram illustrating an example of a cockpit layout in an embodiment of a personal aircraft with a dynamic cockpit display.

FIG. 11 is a diagram illustrating an example of a cockpit layout in an embodiment of a personal aircraft with a dynamic cockpit display. In various embodiments, the cockpit 1100 of FIG. 11 may be embodied in an aircraft such as aircraft 100 of FIGS. 1A through 1D. In the example shown, cockpit 110 includes a cockpit shell or enclosure 1104 in which a seat 1106 and passenger 1108 seated on seat 1106 are shown. A display device 1110 is mounted opposite the passenger 1108. In the example shown, the display device 1110 is mounted out of reach of the passenger 1108 when the passenger 1108 is seated and secured in (e.g., by a seat belt or harness) in the seat 1106. In various embodiments, mounting the display device 1110 out of reach of the passenger enables an operator and/or owner of the aircraft to control the display of information to the passenger 1108 and avoids the passenger 1108 attempting to change or otherwise interact with the display. In the example shown, cockpit 1100 includes a speaker 1112 and a microphone 1114, which in various embodiments may be used to facilitate communication between the passenger 1106 and a remote control station (not shown), e.g., at a ground or other base station and/or a supervisory aircraft, drone, etc. flying nearby. In some embodiments, speaker 1112 and microphone 1114 are integrated with and incorporated into a headset, helmet, etc. (not shown). In this example, a "panic" or "phone home" button 1116 is provided within reach of the passenger 1108, to enable the passenger 1108 to initiate communication with a remote station, such as to report an emergency, request assistance, obtain reassurance, etc. In some embodiments, a video camera (not shown in FIG. 11) is provided to enable video or still images of the passenger to be provided to a remote recipient, e.g., to assess the well-being of passenger 1108 and/or to facilitate more personal communication with the passenger 1108.

In various embodiments, techniques disclosed herein enable a flight experience to be improved, for example for non-pilots and/or in the context of autonomous flight, by providing an aircraft cockpit display that is informative, reassuring, and well synchronized with the real world flight experience of the passenger.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft cockpit flight display system, comprising:

a display device; and a processor coupled to the display device and configured to:

receive one or more sensor inputs indicating a geo-location of an aircraft with which the display device is associated and an orientation of the aircraft in three dimensional space relative to the ground, wherein the orientation of the aircraft is in a state associated with level flight, a state associated with a maneuver in which the aircraft is banking left, or a state associated with a maneuver in which the aircraft is banking right;

use a set of visual content assets to generate based at least in part on the one or more sensor inputs a displayed scene comprising a graphical representation of the aircraft and a surrounding scene the content of which is determined at least in part by the geo-location and the orientation of the aircraft;

include in the displayed scene a representation of at least a next upcoming portion of a flight path of the aircraft, wherein a horizon as displayed is displayed in the displayed scene at an angle that matches an angle at which the horizon appears to a passenger as viewed through a cockpit window as the aircraft banks to execute a turn, the upcoming portion of a flight path being represented at least in part by a ribbon-like path extending from a forward end of the aircraft, wherein in the event that the flight path indicates that the aircraft is shown to turn right or left, the ribbon-like path twists right or left in regions associated with a change in course, wherein an extent of a twist of the ribbon-like path is determined based on two or more of the following: a model of the aircraft and its flight, current airspeed, or an airspeed at which the turn is expected; and display the displayed scene via the display device;

wherein the processor is configured to generate and display updates to the displayed scene to synchronize the displayed scene with a real world environment through which the aircraft is traveling.

2. The system of claim 1, wherein the display device is mounted in an aircraft cockpit of the aircraft.

3. The system of claim 1, wherein the processor is on board the aircraft.

4. The system of claim 1, wherein the indication of the geo-location comprises global positioning system (GPS) data.

5. The system of claim 1, wherein the ribbon-like path is at least partly transparent to reveal in part a portion of terrain over which the aircraft is about to fly.

6. The system of claim 1, wherein the ribbon-like path as displayed is shown to twist in a direction associated with an upcoming turn maneuver of the aircraft.

7. The system of claim 1, wherein the processor is further configured to display a flight progress display portion that reflects an extent of progress of the aircraft along a flight route.

8. The system of claim 7, wherein flight progress display portion reflects the extent of progress of the aircraft along the flight route at least in part by displaying the flight route with a completed portion and a yet-to-be-completed portion each displayed in a manner that provides a visual distinction between the two.

9. The system of claim 1, wherein the processor is further configured to display flight metrics in a flight metrics display region of the display device.

10. The system of claim 1, wherein the processor is configured to display one or more animation sequences, each associated with a corresponding transition of the aircraft.

11. The system of claim 1, further comprising a user selectable control and wherein the processor is responsive to user selection of the user selectable control to establish a communication session between the aircraft and a control station.

12. The system of claim 1, wherein an extent of a twist of the ribbon-like path is determined based on the following: a model of the aircraft and its flight, current airspeed, and an airspeed at which the turn is expected.

13. The system of claim 1, wherein the ribbon-like path tapers to a narrow segment at a far end of the ribbon-like path.

14. A method to provide an aircraft cockpit flight display, comprising:

receiving one or more sensor inputs indicating a geo-location of an aircraft with which the display device is associated and an orientation of the aircraft in three dimensional space relative to the ground, wherein the orientation of the aircraft is in a state associated with level flight, a state associated with a maneuver in which the aircraft is banking left, or a state associated with a maneuver in which the aircraft is banking right;

using use a set of visual content assets to generate based at least in part on the one or more sensor inputs a displayed scene comprising a graphical representation of the aircraft and a surrounding scene the content of which is determined at least in part by the geo-location and the orientation of the aircraft;

including in the displayed scene a representation of at least a next upcoming portion of a flight path of the aircraft, wherein a horizon as displayed is displayed in the displayed scene at an angle that matches an angle at which the horizon appears to a passenger as viewed through a cockpit window as the aircraft banks to execute a turn, the upcoming portion of a flight path being represented at least in part by a ribbon-like path extending from a forward end of the aircraft, wherein in the event that the flight path indicates that the aircraft is shown to turn right or left, the ribbon-like path twists right or left in regions associated with a change in course, wherein an extent of a twist of the ribbon-like path is determined based on two or more of the following: a model of the aircraft and its flight, current airspeed, or an airspeed at which the turn is expected; and displaying the displayed scene via a display device;

wherein updates to the displayed scene are generated and displayed to synchronize the displayed scene with a real world environment through which the aircraft is traveling.

15. The method of claim 14, wherein the display device is mounted in an aircraft cockpit of the aircraft.

16. The method of claim 14, further comprising displaying a flight progress display portion that reflects an extent of progress of the aircraft along a flight route.

17. A computer program product to provide an aircraft cockpit flight display, the computer program product being embodied in a non-transitory computer readable storage medium and comprising computer instructions for:

receiving one or more sensor inputs indicating a geo-location of an aircraft with which the display device is associated and an orientation of the aircraft in three dimensional space relative to the ground, wherein the orientation of the aircraft is in a state associated with level flight, a state associated with a maneuver in which the aircraft is banking left, or a state associated with a maneuver in which the aircraft is banking right;

using use a set of visual content assets to generate based at least in part on the one or more sensor inputs a displayed scene comprising a graphical representation of the aircraft and a surrounding scene the content of which is determined at least in part by the geo-location and the orientation of the aircraft;

including in the displayed scene a representation of at least a next upcoming portion of a flight path of the aircraft, wherein a horizon as displayed is displayed in the displayed scene at an angle that matches an angle at which the horizon appears to a passenger as viewed through a cockpit window as the aircraft banks to execute a turn, the upcoming portion of a flight path being represented at least in part by a ribbon-like path extending from a forward end of the aircraft, wherein in the event that the flight path indicates that the aircraft is shown to turn right or left, the ribbon-like path twists right or left in regions associated with a change in course, wherein an extent of a twist of the ribbon-like path is determined based on two or more of the following: a model of the aircraft and its flight, current airspeed, or an airspeed at which the turn is expected; and displaying the displayed scene via a display device;

wherein updates to the displayed scene are generated and displayed to synchronize the displayed scene with a real world environment through which the aircraft is traveling.

* * * * *